United States Patent Office

3,275,609
Patented Sept. 27, 1966

3,275,609
BIS(TRIFLUOROMETHYL)THIOKETENE, ITS
DIMER AND ITS HOMOPOLYMER
Maynard S. Raasch, Wilmington, Del., assignor to E. I.
du Pont de Nemours and Company, Wilmington, Del.,
a corporation of Delaware
No Drawing. Filed Jan. 7, 1963, Ser. No. 249,606
9 Claims. (Cl. 260—79.7)

This invention relates to, and has as its principal objects provision of, a new thioketene, its dimer and polymers, and methods of preparing these compounds.

Thioketenes, i.e., the products characterized by the presence of the group $>C=C=S$, have been unknown in their monomeric form until very recently. The few thioketenes mentioned in the early literature were later found to be dimers. More recently, Staudinger [see, e.g. Staudinger et al., Helv. chim. Acta 3, 853 (1920)] studied diphenylthioketene but found it to be so unstable that it could be obtained only in polymeric form. Except for the special case of carbon subsulfide, the only known monomeric thioketenes are those described in U.S. Patent 3,035,030 to E. G. Howard, which have the formula $RHC=C=S$, where R is hydrogen or hydrocarbon. These are unstable compounds which must be stored at low temperature and polymerize even at $-80°$ C. No monomeric disubstituted thioketenes $R_2C=C=S$ have been reported, and no fluorinated thioketenes of any kind are known either as monomers or polymers.

It has now been found that a new, highly fluorinated thioketene is unexpectedly characterized by extraordinary stability, even at elevated temperatures.

The new products made available by this invention are the stable bis(trifluoromethyl)thioketene, $(CF_3)_2C=C=S$; its cyclic dimer, 2,4-bis(hexafluoroisopropylidene)-1,3-dithietane,

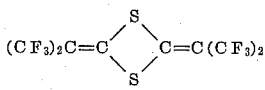

and its linear homopolymer.

The first two products named above are prepared by a process which comprises (1) reacting a 2,4-bis(dicarbalkoxymethylene)-1,3-dithietane with at least a stoichiometric amount of sulfur tetrafluoride at a temperature of at least 100° C. and in the presence of an inorganic fluoride ion acceptor, whereby the carbalkoxy groups are converted to trifluoromethyl groups and 2,4-bis(hexafluoroisopropylidene)-1,2-dithietane is formed; and (2) pyrolyzing 2,4-bis(hexafluoroisopropylidene)-1,3-dithietane at a temperature in the range of 450–900° C. to produce monomeric bis(trifluoromethyl)thioketene.

These reactions are represented by the equations:

(1)

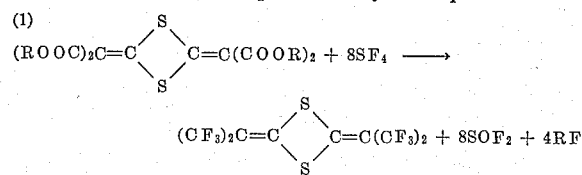

where R is an alkyl group; and (2)

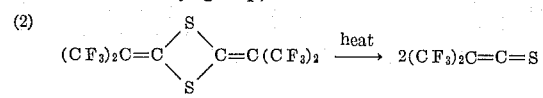

Bis(trifluoromethyl)thioketene has remarkable thermal stability. It does dimerize spontaneously to 2,4-bis(hexafluoroisopropylidene)-1,3-dithietane but this reaction is extremely slow (less than 10% dimerization in 6 months at room temperature; about 9% on heating in glass at 100° C. for 30 hours).

Bis(trifluoromethyl)thioketene can be converted to linear polymers by maintaining it in contact at low temperature, below about $-30°$ C., with a substance which, electronically speaking, is a base, i.e., a substance containing at least one pair of unshared electrons and capable of donating such electrons. In the presence of such an initiator, partial dimerization also takes place at the same time at these low temperatures and becomes the preponderant reaction at higher temperatures. Above about 0° C. in the presence of the same basic initiators, dimerization is essentially quantitative and little or none of the linear polymer is formed.

The 2,4 - bis(dicarbalkoxymethylene) - 1,3-dithietanes which serve as the starting materials in the process of this invention can be prepared by reaction of a dialkyl sodiomalonate with thiophosgene in accordance with the equation:

$4NaCH(COOR)_2 + 2CSCl_2 \longrightarrow$

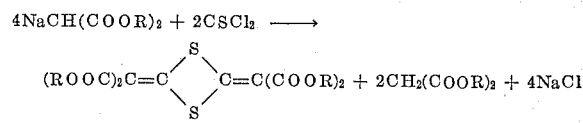

The nature of the carbalkoxy groups is immaterial, since these groups are converted to trifluoromethyl groups in the first step of the process. For this reason, the preferred dialkyl sodiomalonates are the most economically accessible ones, which are those in which the radical R is 1–6 carbon alkyl, and preferably methyl or ethyl. A preparation of 2,4-bis(dicarbethoxymethylene)-1,3-dithietane is given below. This compound has been reported in the early literature [Bergreen, Ber. 21, 348 (1888); Wenzel, Ber. 34, 1043 (1901)] although the prior workers assumed it to have a different structure.

In a 5-liter, three-necked flask fitted with stirrer, reflux condenser and dropping funnel were placed 640 g. (4 moles) of diethyl malonate and 1500 ml. of tetrahydrofuran. Sodium hydride (180 g. of a 53% oil dispersion, 4 moles) was added in portions. Toward the end, heat from a steam bath was applied to hasten the solution of the last of the sodium hydride. The solution was then maintained at 20–30° C. by cooling with ice while 230 g. (2 moles) of thiophosgene in 200 ml. of tetrahydrofuran was added during one hour. The mixture was stirred 20 minutes longer and 1300 ml. of water was then added. The slurry was filtered and washed on the filter with ether, then with water, and finally with ethanol. The yield of air-dried product was 250 g. or 62%. Except for an off-color, the product was essentially pure and melted at 179–180° C. Absence of sodium chloride was shown by a negative test with silver nitrate on a water wash of a portion of the product.

In the first step of the process, a 2,4-bis(dicarbalkoxymethylene)-1,3-dithietane is reacted with sulfur tetrafluoride as shown in Equation 1 above. For complete conversion of the four carbalkoxy groups, at least a stoichiometric amount of sulfur tetrafluoride is used, i.e., at least 8 moles of sulfur tetrafluoride per mole of dithietane. Preferably, the sulfur tetrafluoride is used in excess, for example in a molar ratio between 8:1 and 30:1 with respect to the dithietane.

A fluoride ion acceptor serving as catalyst or promoter is used to help the reaction proceed at temperatures below those which cause excessive decomposition of the organic reactant. Fluoride ion aceептors suitable for this use include hydrogen fluoride, boron trifluoride, and the fluorides of elements in Group V–A having an atomic number of 15–51, inclusive (phosphorus, arsenic and antimony). The fluoride ion acceptor can be used in catalytic amounts, e.g., between 0.01 and 0.1 mole per mole of sulfur tetrafluoride, but, to obtain maximum benefit, i.e., complete fluorination at temperatures as low as possible, it is recommended to use it in higher amounts, e.g., between about 0.25 mole and about 2.0 moles per mole of sulfur tetrafluoride. Hydron fluoride is the preferred reaction promoter.

The reaction is conducted at temepratures in the range from about 100° C. up to the decomposition point of the organic reactant, or, in practice, up to about 350° C. In the presence of a reaction promoter in relatively large amounts, as discussed above, the reaction takes place at a temperature as low as 100° C. and proceeds at a satisfactory rate between 125 and 200° C. If the promoter is present in catalytic amounts, higher temperatures, in the range of 200–350° C., are recommended for complete fluorination.

A solvent or diluent is not necessary, but use can be made if desired of an organic liquid medium inert toward sulfur tetrafluoride, for example a hydrocarbon such as cyclohexane or benzene or a fluorinated hydrocarbon such as perfluorodimethylcyclohexane or sym-tetrachlorodifluoroethane.

The reaction is conducted in corrosion-resistant sealed vessels, preferably at the autogenous pressure developed by the reactants and reaction products at the operating temperature, although additional pressure, supplied by sulfur tetrafluoride or an inert gas, can be applied if desired. The vessel is preferably agitated during the operation.

The reaction can be conducted in one single operation and this gives the desired product, but the conversions are rather low when working in the desirable lower temperature range. It has been found that very high conversions are obtained by operating in two stages. First, the 2,4-bis(dicarbalkoxymethylene)-1,3-dithietane is reacted with approximately the calculated amount of sulfur tetrafluoride containing a relatively low amount (e.g., 0.2–0.5 mole per mole) of promoter, preferably hydrogen fluoride, for a period of time of 2–8 hours in the temperature range of 125–200° C. The volatile by-products are then removed, the vessel is recharged with additional sulfur tetrafluoride and promoter, the latter being used in somewhat larger proportions, e.g., 0.75–2 moles per mole, and the operation is repeated.

The resulting 2,4-bis(hexafluoroisopropylidene)-1,3-dithietane is a crystalline solid which may be isolated by any suitable method and, if necessary, purified by recrystallization from an appropriate solvent.

In the second step of the process, 2,4-bis(hexafluoroisopropylidene)-1,3-dithietane is converted to bis(trifluoromethyl)thioketene by pyrolyzing it at a temperature in the range of 450–900° C., and preferably in the range of 600–750° C. To avoid side reactions it is preferred, though not essential, to operate in an inert atmosphere, for example in an atmosphere of nitrogen, carbon dioxide or argon. The pyrolysis can be conducted in various ways, but, most conveniently, the dithietane is distilled through a metal tube maintained at pyrolysis temperature and the thioketene is collected in a cold trap at the exit end of the tube and purified by distillation. The pyrolysis is normally effected at atmospheric pressure but reduced pressures can be used if desired.

Polymerization of bis(trifluoromethyl)thioketene to linear polymers or to the cyclic dimer, or mixtures of the two, is effected by maintaining it in contact with a substance containing an element with one or two pairs of unshared electrons. As is well known, these electron donors are viewed as bases in terms of G. N. Lewis' concept of acids and bases, and they are commonly called Lewis bases, even though some of them have extremely low basic strength, or none at all, in the classical sense. The principal types of Lewis bases are organic molecules containing a fifth—or sixth—group element (especially nitrogen, phosphorus, oxygen and sulfur) with unshared electrons. Preferred Lewis bases for use in the process include the following groups of compounds, each entirely hydrocarbon except for the named functional group: carboxylic acid esters, e.g., ethyl acetate, methyl propionate; aliphatic and heterocyclic amines, e.g., trimethylamine, triethylamine, cyclohexylamine, pyridine, N-methylpiperidine, triethanolamine, ethylenediamine; quaternary ammonium hydroxides, e.g., tetraethylammonium hydroxide, benzyltriethylammonium hydroxide; alcohols, e.g., methanol, ethanol, isopropyl alcohol; ethers, e.g., diethyl ether, di-n-butyl ether, anisole, dioxane, tetrahydrofuran; sulfides, e.g., diethyl sulfide; sulfoxides, e.g., dimethyl sulfoxide; ketones, e.g., acetone, methyl ethyl ketone, cyclohexanone; mercaptans, e.g., butanethiol, benzenethiol; amides, e.g., acetamide, dimethylformamide; nitriles, e.g., acetonitrile, benzonitrile; organic triesters of phosphoric and phosphorous acids, e.g., triethyl phosphate, trimethyl phosphite, triphenyl phosphite; and phosphines, e.g., trimethyl phosphine, triphenyl phosphine.

Some of these materials are chemically reactive with bis(trifluoromethyl)thioketene but nevertheless suitable as polymerization initiators since the competing chemical reaction is generally the slower one at low or ordinary temperatures.

The basic initiator can be used either in massive amounts or in catalytic amounts, e.g., in amounts as low as 0.001 mole per mole of thioketene. At temperatures below about −30° C., appreciable amounts of linear thioketene polymer are formed, and in general at least some of the thioketene dimerizes at the same time. At higher temperatures in the presence of a basic initiator, dimer formation preponderates. At temperatures of the order of 0° C. or higher, the dimer, i.e., 2,4-bis(hexafluoroisopropylidene)-1,3-dithietane, forms exothermically and is essentially the sole polymerization product. Another factor, besides low temperatures, which favors the formation of linear polymers is the use of a Lewis base initiator which is neutral on the pH scale.

Mixtures of the dimer with the linear polymer can be separated into their components by treatment with an organic solvent which dissolves the dimer but not the linear polymer.

The linear polymer of bis(trifluoromethyl)thioketene is a colorless, high melting solid insoluble in the common organic solvents. For this reason, its molecular weight is not readily determinable, although, from the properties of the polymer, it is estimated to be in excess of 1000, that is, the polymer contains at least five bis(trifluoromethyl)thioketene units. The fact that the polymer is colorless suggests that it consists, at least in part, of units having the structure

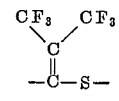

since, if

groups were present, the polymer would be expected to be colored. The infrared spectrum is consistent with this view.

The following examples illustrate the invention.

*Example 1*

A 400-ml., stainless steel-lined tube containing 60 g. (0.149 mole) of 2,4-bis(dicarbethoxymethylene)-1,3-dithietane was cooled to −80° C. and charged with 10 g. (0.5 mole) of hydrogen fluoride and 125 g. (1.16 moles) of sulfur tetrafluoride. The tube was heated with agitation for 2 hours each at 125° C. and 150° C. and 4 hours at 200° C. It was then cooled to room temperature, bled of volatile products, cooled to −80° C. and charged again with 35 g. (1.75 moles) of hydrogen fluoride and 125 g. (1.16 moles) of sulfur tetrafluoride. The recharged tube was heated at 150° C. for 2 hours and 200° C. for 4 hours, cooled to room temperature and bled, and the contents were unloaded into a polyethylene bottle. The reaction product was poured onto ice and the crystalline solid which formed was separated by filtration and washed with water and 10% aqueous sodium carbonate solution. The product was then steam-distilled and filtered from the aqueous distillate. The moist crystals were dissolved in boiling methylene chloride, anhydrous magnesium sulfate was added to remove moisture, and the solution was filtered hot. Cooling of the filtrate gave 40 g. (69% yield) of 2,4-bis(hexafluoroisopropylidene)-1,3-dithietane in two crops. This products melts at 84.5–85.5° C. and boils at 173° C.

*Analysis.*—Calcd. for $C_8F_{12}S_2$: C, 24.75; F, 58.74; S, 16.52. Found: C, 24.96; F, 58.28; S, 16.83.

*Example 2*

An apparatus for the pyrolysis of 2,4-bis(hexafluoroisopropylidene)-1,3-dithietane was constructed of an unpacked platinum tube, 60 cm. long and 1.25 cm. in diameter, with stainless steel inner joints silver soldered to each end. The tube, fitted with thermocouples, was mounted in a cylindrical heater 30 cm. long, and the assembly was set on a vertical stand at a 30° angle. The lower end of the tube was connected to a glass trap protected with a drying tube and cooled in a dry ice-acetone mixture. The upper end of the tube was connected to the side arm of a distilling flask provided with a nitrogen inlet in its neck. The neck and side arm of the flask and the upper end of the pyrolysis tube were wrapped with glass cloth heating tape to keep these parts above the melting point (85° C.) of the dithietane.

The pyrolysis tube was heated to 650° C. and a total of 75 g. of 2,4-bis(hexafluoroisopropylidene)-1,3-dithietane was distilled through under a very slow stream of nitrogen during a 3-hour period. The product collected in the cold trap was distilled to give 50 g. (67% yield) of bis(trifluoromethyl)thioketene boiling at 51–53° C., mostly 53° C., obtained as a reddish orange liquid, $n_D^{25}$ 1.3502, $D_4^{25}$ 1.462.

*Analysis.*—Calcd. for $C_4F_6S$: C, 24.75; F, 58.74; S, 16.52. Found: C, 24.95; F, 58.65; S, 16.54.

The structure is supported by the $F^{19}$ nuclear magnetic resonance spectrum, showing a single peak.

The unexpected thermal stability of bis(trifluoromethyl)thioketene is shown by the fact that it can be distilled at atmospheric pressure, and also that it survives the pyrolysis temperature without appreciable polymerization. After the compound is stored for six months in a glass container at room temperature and under ordinary lighting conditions, it still contains at least 90% of monomer, the rest being the cyclic dimer.

*Example 3*

To bis(trifluoromethyl)thioketene at room temperature was added a trace of triethylamine. The thioketene was converted quantitatively to its dimer, 2,4-bis(hexafluoropropylidene)-1,3-dithietane, with evolution of considerable heat.

The same result was obtained using triphenylphosphine, acetonitrile and acetone as initiators for the dimerization in catalytic amounts, or by adding the thioketene to a solution of sodium hydroxide in aqueous ethanol.

*Example 4*

To 10 ml. of acetone cooled to −80° C. and stirred was added dropwise 1.0 g. of bis(trifluoromethyl)thioketene. Polymerization occurred rapidly. The white solid which formed was collected by filtration and washed with acetone to remove the dimer. The insoluble material, obtained in 47% conversion, was the linear polymer of bis(trifluoromethyl)thioketene. It melted at 245° C. and depolymerized back to bis(trifluoromethyl)thioketene at slightly higher temperatures.

*Analysis.*—Calcd. for $(C_4F_6S)_n$: C, 24.75; F, 58.74; S, 16.52. Found: C, 24.80; F, 58.18; S, 16.73.

The infrared spectrum indicated the presence of carbon-to-carbon double bonds.

The polymer could be molded to hard, rigid objects at its melting point. By conducting the polymerization on a flat surface wet with acetone, a self-supporting, flexible film was formed.

*Example 5*

Bis(trifluoromethyl)thioketene was polymerized as described in Example 4, except that the acetone was replaced by the Lewis bases listed in the following table. Linear polymers having properties similar to that of Example 4 were obtained in the conversions shown. The remainder of the monomer was converted to the dimer.

| Initiator | Temperature, °C. | Percent Conversion |
|---|---|---|
| Acetonitrile | −35 | 25 |
| Ethanol | −80 | 38 |
| Ethyl acetate | −80 | 15 |
| N-Methylpyrrolidone (in methylene chloride solution) | −80 | 7 |

Bis(trifluoromethyl)thioketene is useful as a modifying agent for natural rubber, as shown by the following test:

To 5 g. of smoked natural rubber dissolved in 100 ml. of methylene chloride was added 7 g. of bis(trifluoromethyl)thioketene. The solution was allowed to stand for 20 hours, during which the color of the thioketene faded. The solution was then subjected to steam distillation, which removed the solvent and any thioketene dimer present. The residual polymer was first air dried, then dried for 4 hours at 100° C. under 0.1 mm. pressure. It then had the following analysis: C, 67.32; H, 8.28; F, 17.35; S, 5.06. This corresponds to a composition containing 30% of combined bis(trifluoromethyl)thioketene, or a mole ratio of one bis(trifluoromethyl)thioketene unit to about 6.8 isoprene units.

Sample of the modified rubber and of unmodified rubber as the control were cured according to the following recipe:

|   | Parts |
|---|---|
| Rubber | 10 |
| Zinc oxide | 0.6 |
| Stearic acid | 0.05 |
| Mercaptobenzothiazole | 0.05 |
| Sulfur | 0.35 |

The ingredients were milled together and cured in a mold for 40 minutes at 127° C. The modified rubber was found to have improved heat resistance as compared to the control.

Bis(trifluoromethyl)thioketene is also useful in the treatment of wool to improve its water repellency, as shown by the following test:

Wool was moistened with bis(trifluoromethyl)thioketene and kept in a closed container for 20 hours. The wool was then allowed to stand in air for 24 hours and finally heated for one hour at 100° C. under reduced pressure to insure evaporation of any bis(trifluoromethyl)thioketene dimer that might be present. Water drops placed on the treated wool remained spherical indefinitely until the water evaporated, whereas water drops placed on untreated wool were soon absorbed.

As has been shown, 2,4-bis(hexafluoroisopropylidene)-1,3-dithietane is useful as an intermediate in the synthesis of bis(trifluoromethyl)thioketene. In view of its high thermal stability (up to about 400° C.) it is further useful per se as a heat transfer medium.

The linear polymers of bis(trifluoromethyl)thioketene exhibit a high degree of chemical inertness. They can be pressed, molded or extruded into various structures such as films, filaments or shaped articles. For example, films of these polymers are useful as inert gasket material or liners for containers intended for corrosive materials.

Since obvious modifications and equivalents in the invention will be evident to those skilled in the chemical The embodiments of the invention in which an exclusive property or privilege is claimed are defined as follows:

1. Bis(trifluoromethyl)thioketene.
2. 2,4-bis(hexafluoroisopropylidene)-1,3-dithietane.
3. A homopolymer of bis(trifluoromethyl)thioketene.
4. The process of preparing bis(trifluoromethyl)thioketene which comprises pyrolyzing 2,4-bis(hexafluoroisopropylidene)-1,3-dithietane at a temperature in the range of 450–900° C.
5. The process of preparing 2,4-bis(hexafluoroisopropylidene)-1,3-dithietane which comprises reacting a 2,4-bis(dicarbalkoxymethylene)-1,3-dithietane with sulfur tetrafluoride at a temperature of at least 100° C. in the presence of an inorganic fluoride ion acceptor.
6. The process of preparing 2,4-bis(hexafluoroisopropylidene)-1,3-dithietane which comprises reacting 2,4-bis(dicarbethoxymethylene)-1,3-dithietane with sulfur tetrafluoride at a temperature of at least 100° C. in the presence of hydrogen fluoride.
7. A manufacture formed from a homopolymer of bis(trifluoromethyl)thioketene.
8. A film formed from a homopolymer of bis(trifluoromethyl)thioketene.
9. The process of homopolymerizing bis(trifluoromethyl)-thioketene to form a homopolymer of claim 3 which comprises contacting the same, at a temperature below −30° C., with a Lewis base, hydrocarbon except for the named functional group, selected from the group consisting of: carboxylic acid esters; aliphatic and heterocyclic amines; quaternary ammonium hydroxides; alcohols; ethers; sulfides; sulfoxides; ketones, mercaptans; amides; nitriles; organic triesters of phosphoric and phosphorous acids; and phosphines.

References Cited by the Examiner

UNITED STATES PATENTS 3,035,030  5/1962  Howard _____ 260—79.7

OTHER REFERENCES

Staudinger et al.: Helvetica Chimica Acta 3, page 853 (1920).

JOSEPH L. SCHOFER, *Primary Examiner.*

J. F. McNALLY, *Assistant Examiner.*